May 3, 1927.
R. E. NEILSON
SAFETY HOOK
Filed May 12, 1926
1,626,865
2 Sheets-Sheet 2
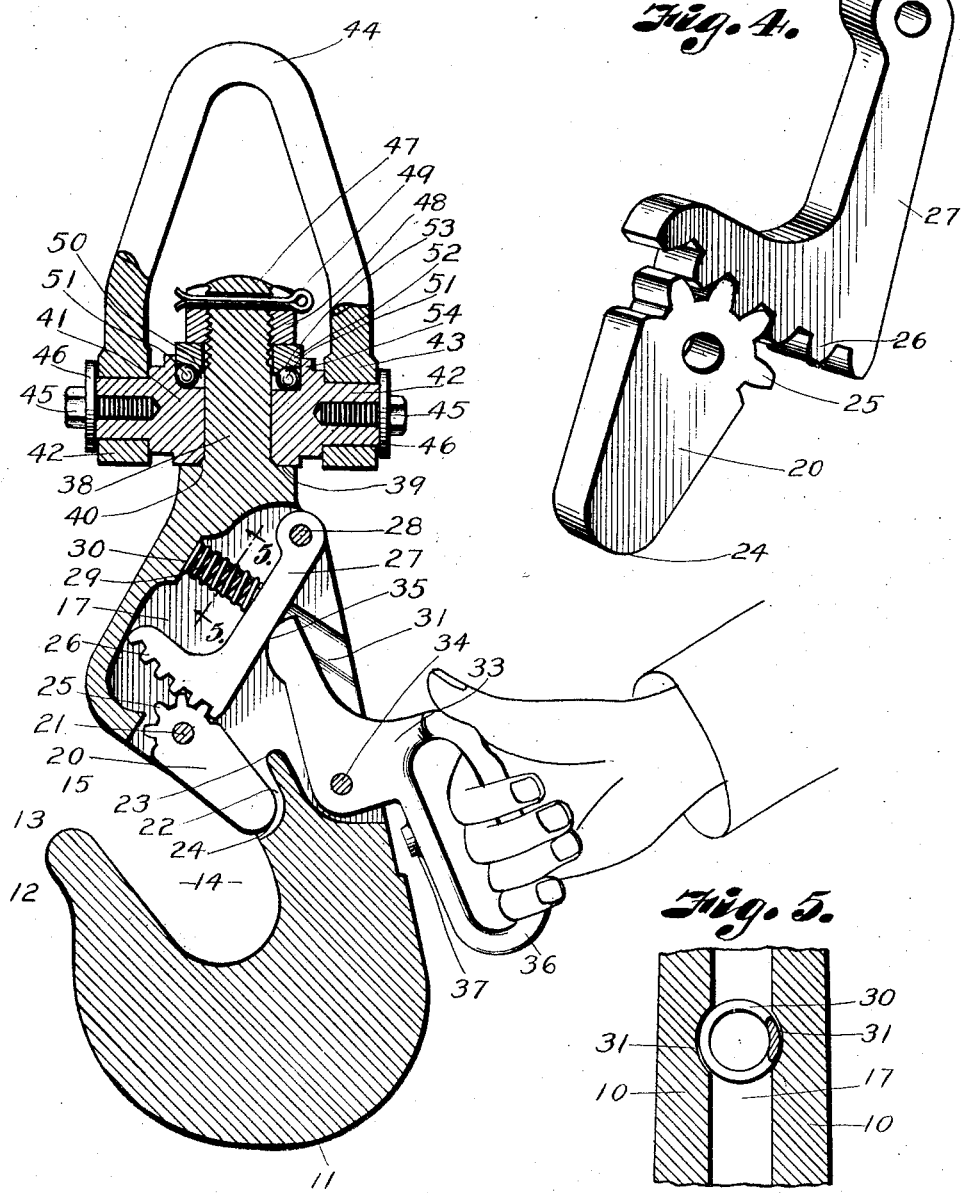
INVENTOR
Robert E. Neilson.
BY
Arthur C. Brown,
ATTORNEY Patented May 3, 1927.

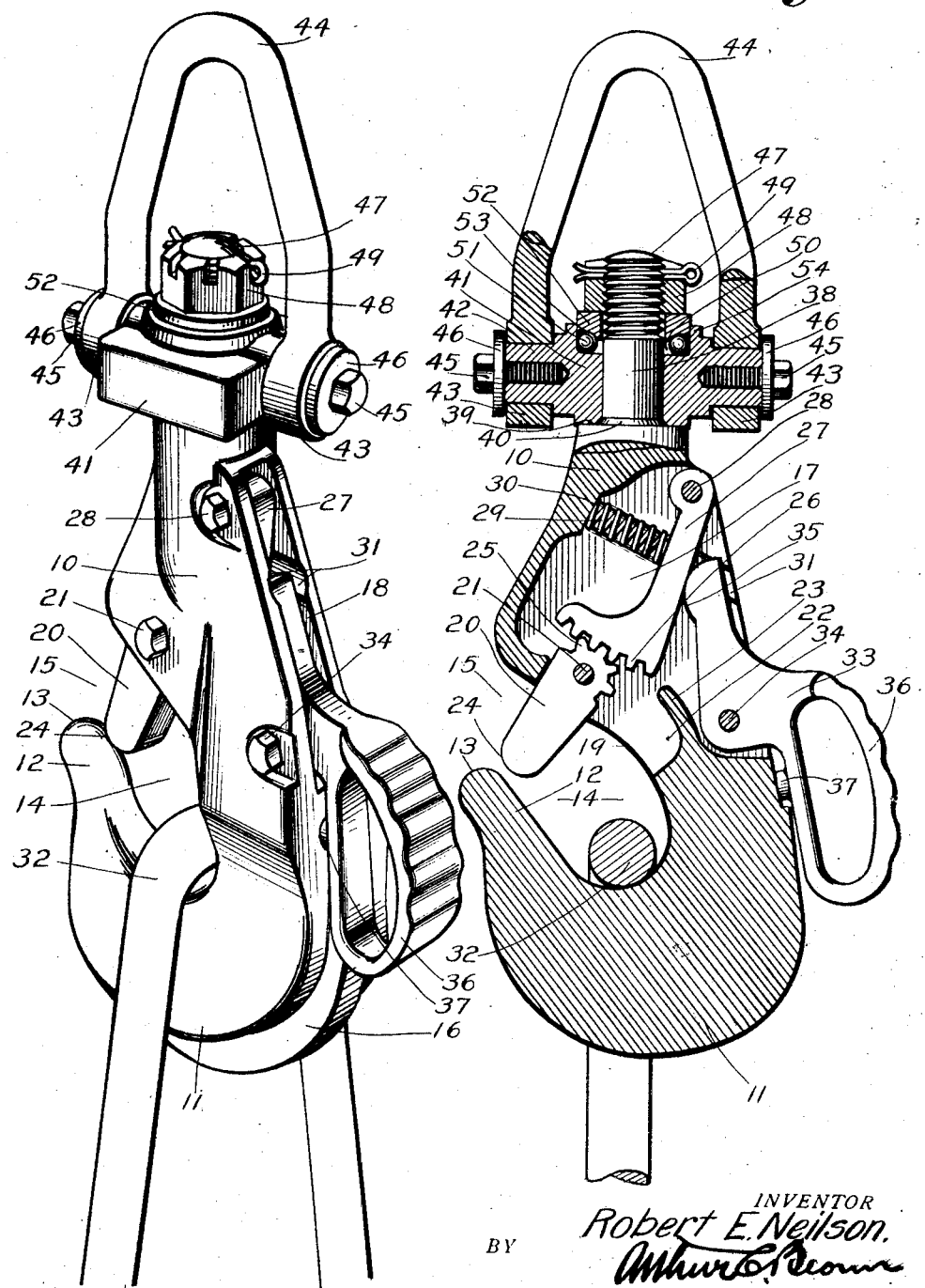

1,626,865

UNITED STATES PATENT OFFICE.

ROBERT E. NEILSON, OF TULSA, OKLAHOMA.

SAFETY HOOK.

Application filed May 12, 1926. Serial No. 108,552.

My invention relates to safety hooks and more particularly to safety hooks for use in connection with elevators and similar oil well apparatus.

It is the purpose of my invention to provide a safety hook that has means for preventing the accidental disengagement of a bail or similar member therefrom and which is provided with means for operating a bail-retaining member so as to move the same to releasing position comprising a lever mounted on the body portion of the hook. The retaining member preferably is pivotally mounted in the body portion of the hook and is adapted to close the entrance to the hook, being held in such position by means of a resilient member and being preferably provided with teeth that mesh with teeth on a pivotally mounted member with which the resilient member engages. The operating lever is preferably provided with a cam surface that engages with said last-mentioned pivotally mounted member so as to move the same against the action of the spring. The spring is preferably unattached to the pivotally mounted member and the casing, being merely mounted in grooves in the casing and engaging at opposite ends with the casing and pivotally mounted member.

It is a further purpose of the invention to provide a lever for operating the retaining member to move the same to releasing position with a handle, the lever being so mounted and the handle being so located that after the lever has moved the retaining member to bail-releasing position, said handle can be used for swinging the hook out of the bail. This is an important feature of the invention because, due to the weight of the bail members and parts attached thereto, it is difficult to raise the bail out of the hook and by making the hook so that the same can be removed from the bail without lifting the bail but merely swinging the same by means of the lever handle, the hook can be removed from the bail with great ease without the necessity of lifting any heavy parts.

It is a further purpose of my invention to provide a new and improved swivel mounting for my safety hook comprising a bail member that engages with trunnions on a member embracing a shaft on the hook and bearing balls mounted in a suitable ball race in such a manner that the dust is excluded therefrom; this being preferably accomplished by recessing the member embracing the shaft-like portion on the hook and providing a ball-retaining member that seats in the recess so as to provide a substantially dust-tight joint between the retaining member and the wall of the member having the recess therein.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a perspective view of my improved safety hook, showing a portion of the bail members associated therewith.

Fig. 2 is a vertical, sectional view thereof.

Fig. 3 is a view similar to Fig. 2, showing the retaining member moved to releasing position.

Fig. 4 is a perspective view of the retaining member and the pivoted member engaging therewith, and Fig. 5 is a fragmentary, enlarged, sectional view showing the spring and the seat therefor.

Referring in detail to the drawings:

My improved safety hook comprises a body portion 10, which terminates in a hook end 11. The hook portion terminates in an upwardly and outwardly extending lip portion 12, the extreme end portion of which is rounded, as indicated at 13, thus providing a recess 14 which extends at an oblique angle toward the end of the hook from the entrance 15 thereto; said entrance being of slightly less width than the main portion of the opening 14. The hook portion 11 may be provided with a strengthening rib 16, if desired.

The body portion 10 is provided with an opening 17 so as to provide a chamber therein for the retaining means and the operating means therefor. The chamber formed by the opening 17 in the body portion 10 opens outwardly at one side of the body portion so as to provide a slot 18 and opens into the opening 14 so as to provide a slot 19.

Mounted within the opening 17 is a retaining member or guard 20, which is pivoted between the side walls of the body portion on the pivot pin 21. The body portion of the hook is further cut away at 22 to provide a recess for receiving the retaining member or guard 20 when the same is in releasing position, as shown in Fig. 3, a fin or lip 23 being provided between said recess 22 and the main portion of the openings 17 to act as a stop for limiting the movement of the member 20. The outer end portion of the member 20 is preferably rounded, as indicated at 24. The rear end portion of the retaining member 20 is provided with a series of teeth 25, which are adapted to mesh with the teeth 26 on the pivotally mounted member 27, said member being pivoted on the pivot pin 28 extending between the side walls of the body portion 10 of the hook. The teeth 25 thus form a portion of a gear that meshes with an arcuate rack formed by the teeth 26 on the member 27. The member 27 is substantially L-shaped, as will be evident from Figs. 2, 3 and 4, in order to provide for the rack formed by the teeth 26.

A compression spring 29 is mounted between the seat 30 provided on the inner wall of the member 10 and the side of the member 27 facing said seat. Said spring 29 is not secured to either the body portion 10 nor to the member 27 but engages with slightly concave grooves 31 formed in the opposite walls of the body portion 10 to hold the spring in position. The spring 29 will have a normal tendency to hold the parts in the position shown in Fig. 2 with the retaining member or guard 20 in hook-closing position, the guard or retaining member 20 then retaining the bail 32 or other member engaged by the hook in engagement with the hook 11 and positively preventing disengagement of the bail or other member therefrom.

When it is desired to disengage the bail 32 from the hook 11, the lever 33 is actuated to move the member 27 against the action of the spring 29; said lever 33 being pivoted on the pivot member 34 between the side walls of the body portion 10 and being provided with a convex cam-shaped end portion 35 that engages with the side of the pivoted member 27 opposite that engaged by the spring 29 to move the same around its pivot in opposition to the spring 29. Such movement is brought about by pulling outwardly on the handle 36 provided on the lever 33, said handle being provided with a stop lug 37 to limit the inward movement thereof. When the lever 33 has been actuated in the manner described above, the parts will move to the position shown in Fig. 3, when the bail 32 can be disengaged from the hook 11.

The end of the body portion opposite the hook end 11 is provided with a reduced, rounded shank portion or shaft portion 38, thus providing a shoulder 39 where the shaft portion 38 joins the body portion 10, the corner between the shoulder and the shaft portion 39 being preferably slightly beveled, as indicated at 40.

A member 41 is mounted rotatably upon the shaft 38 and is provided with the outwardly extending trunnions 42, upon which the enlarged bearing members 43 on opposite ends of the U-shaped bail member 44 are mounted. Thus the body portion of the hook 10 can be swung about the axis of the trunnions 42.

The bail member 44 is held in position on the trunnions 42 by means of the bolts 45, engaging in the screw-threaded openings in the trunnions 42 and the washers 46, held in engagement with the ends of the trunnions by the clamping action of the heads of the bolts 45.

The outer end portion of the shaft 38 is provided with screws threads 47, with which the screw-threaded retaining member 48 engages, said member being locked in engagement therewith by means of the cotter pin 49. The member 41 is provided with a recess 50, surrounding the shaft 38, which forms a ball race for the bearing balls 51, a ball-retaining ring 52, which has a co-operating ball race 53 formed therein, being mounted between the retaining member 48 and the member 41 and overlapping the wall of the recess 50 so as to provide a dust-tight ball race within which the balls 51 are mounted. In order to provide for the overlapping of the ball-retaining ring 52 and the wall of the recess 50, an annular flange 54 is provided on the member 41; thus making it unnecessary to provide any extremely large amount of metal in the member 41 to accommodate the balls 51.

Due to the mounting of the hook on the swivel member 41 having the trunnions 42, the hook can be very readily withdrawn from the bail by merely continuing the upward pull on the handle 36 after the parts have reached the position shown in Fig. 3, whereupon the hook portion 11 will be swung around towards the right in Fig. 3 and the bail 32 will be disengaged from the upwardly projecting portion 12 of the hook; said portion swinging around under the upper portion of the bail 32 as the hook is swung toward the right; this being accomplished due to the mounting of the hook on the bail 44 and due to the mounting of the lever 33 on the body portion 10 as well as due to the particular shape of the opening 14 and the end portion 12 of the hook whereby no opposition to the movement of the hook toward the right from the position shown in Fig. 3 will be encountered because of the bail 32.

What I claim and desire to secure by Letters Patent is:

1. In a safety hook, a body comprising a hook portion and a shank, a latch mounted on the shank for movement across the hook opening to position for retaining an object therein, and an actuator for the latch normally yieldingly urging the latch to functional position, and a handle member having camming relation with the actuator.

2. In a safety hook, a body comprising a hook portion and a shank, the body comprising a chamber opening to the hook channel and through the side of the shank opposite the channel opening, a latch mounted on said body for movement across the channel opening for retaining an object in the channel, and actuating mechanism in the body chamber, comprising an operating member geared to the latch and a handle member operable on the operating member, the handle portion being extended from the side of the body opposite the channel opening.

3. In a safety hook, a body comprising a hook portion and a shank, the shank having a chamber opening to the hook channel and through the side opposite the channel opening, a latch pivotally mounted in said chamber and adapted to swing across the channel opening, an actuator pivotally mounted in said chamber and having operative connection with the latch, a spring urging the actuator to retain the latch in functional position, and a lever pivoted in said chamber having a cam arm for operating the actuator against the tension of said spring, and a handle portion extended from the shank.

In testimony whereof I affix my signature.

ROBERT E. NEILSON.